United States Patent
Koziol et al.

(10) Patent No.: US 11,006,356 B2
(45) Date of Patent: May 11, 2021

(54) IMPROVING CELL ACCESS PROCEDURE

(71) Applicant: NOKIA TECHNOLOGIES OY, Espoo (FI)

(72) Inventors: Dawid Koziol, Glogow (PL); Hakon Helmers, Sceaux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/045,455

(22) PCT Filed: Apr. 5, 2018

(86) PCT No.: PCT/FI2018/050245
§ 371 (c)(1),
(2) Date: Oct. 5, 2020

(87) PCT Pub. No.: WO2019/193237
PCT Pub. Date: Oct. 10, 2019

(65) Prior Publication Data
US 2021/0045049 A1    Feb. 11, 2021

(51) Int. Cl.
*H04W 48/18* (2009.01)
*H04W 48/16* (2009.01)
*H04W 84/04* (2009.01)

(52) U.S. Cl.
CPC ........ *H04W 48/18* (2013.01); *H04W 48/16* (2013.01); *H04W 84/042* (2013.01)

(58) Field of Classification Search
CPC ..... H04W 48/16; H04W 48/18; H04W 48/00; H04W 84/042
See application file for complete search history.

(56) References Cited

U.S. PATENT DOCUMENTS

| 10,506,423 | B2 | 12/2019 | Sebire |
| 2015/0092701 | A1* | 4/2015 | Horn ............ H04W 84/12 370/329 |
| 2017/0288888 | A1 | 10/2017 | Rico Alvarino et al. |
| 2019/0132896 | A1 | 5/2019 | Kusashima et al. |
| 2019/0306763 | A1* | 10/2019 | Humbert ........... H04W 36/03 |

FOREIGN PATENT DOCUMENTS

| RU | 2540809 C2 | 2/2015 |
| WO | WO-2017/065548 A1 | 4/2017 |
| WO | WO-2017/195463 A1 | 11/2017 |

OTHER PUBLICATIONS

3rd Generation Partnership Project; Technical Specification Group Core Network and Terminals; Numbering, Addressing and Identification (Release 15), 3GPP TS 23.003, v15.3.0 (Mar. 2018), 118 pages.

(Continued)

Primary Examiner — Wayne H Cai
(74) Attorney, Agent, or Firm — Alston & Bird LLP (57) ABSTRACT

A method comprising: detecting at a device associated with a first public land mobile network, a cell; receiving, for each of a plurality of public land mobile networks supported by the cell, an indication as to whether or not the cell is available for standalone access for that public land mobile network; and determining, in dependence upon the indications and based on the first public land mobile network, whether to request standalone access of the cell.

20 Claims, 8 Drawing Sheets

(56) References Cited

OTHER PUBLICATIONS

Cell Selection for NR Non-Standalone and NR Standalone UE Operation, R2-168569, 3GPP RSG-RAN WG2 Meeting #96, Huawei (Nov. 2016), 4 pages.
Connection Establishment and Access Control for Standalone NR, R2-167022, 3GPP TSG-RAN WG2 #95bis, LG Electronics Inc. (Aug. 2016), 3 pages.
International Preliminary Report on Patentability (Chapter II) for Application No. PCT/FI2018/050245 dated Jul. 31, 2020, 7 pages.
International Search Report and Written Opinion for Application No. PCT/FI2018/050245 dated Jun. 19, 2018, 5 pages.
Russian Office Action and Search Report for Application No. 2020132970/07 dated Jan. 15, 2021, 11 pages.

* cited by examiner

IMPROVING CELL ACCESS PROCEDURE

CROSS-REFERENCE TO RELATED APPLICATIONS

This application is a national phase entry of International Application No. PCT/FI2018/050245, filed Apr. 5, 2018, the entire contents of which are incorporated herein by reference.

FIELD

The present application relates to a method, apparatus, system and computer program. In particular, but not exclusively, the present application relates to determining whether to perform an access procedure in a cell in dependence upon whether or not the cell supports standalone access for a public land mobile network of a device.

BACKGROUND

A communication system can be seen as a facility that enables communication sessions between two or more entities such as user terminals, base stations and/or other nodes by providing carriers between the various entities involved in the communications path. A communication system can be provided, for example, by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system, at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. Standardization of 5G or New Radio networks is currently under discussion. LTE is being standardized by the 3rd Generation Partnership Project (3GPP). Documents "Cell selection for NR non-standalone and NR standalone UE operation" (R2-168569) and "Connection establishment and access control for standalone NR" (R2-167022) discuss network access in connection of NR.

SUMMARY

According to a first aspect, there is provided a method comprising: detecting at a device associated with a first public land mobile network, a cell; receiving, for each of a plurality of public land mobile networks supported by the cell, an indication as to whether or not the cell is available for standalone access for that public land mobile network; and determining, in dependence upon the indications and based on the first public land mobile network, whether to request standalone access of the cell.

In some embodiments, the cell is available for standalone access for some of the plurality of public land mobile networks; and the cell is unavailable for standalone access for some of the plurality of public land mobile networks.

In some embodiments, the method comprises, if the indications indicate that the cell is available for standalone access for the first public land mobile network, requesting standalone access for the cell.

In some embodiments, at least prior to requesting standalone access for the cell, the device is in IDLE mode.

In some embodiments, the method comprises, if the indications indicate that the cell is unavailable for standalone access for the first public land mobile network, accessing the cell in dual connectivity mode.

In embodiment, the method comprises receiving from the base station, a system information block comprising the indications as to whether or not the cell is available for standalone access for the plurality of public land mobile networks.

In some embodiments, wherein for at least one of the plurality of public land mobile networks, the indication comprises a presence or absence of a tracking area code.

In some embodiments, wherein for at least one of the plurality of public land mobile networks, the indication comprises a binary indicator in a field of tracking area code information.

In some embodiments, wherein, for at least one of the plurality of public land mobile networks, the indication comprises a binary indicator in cell access related information.

According to a second aspect, there is provided a method comprising: for each of a plurality of public land mobile networks supported by a cell, causing a transmission to a device of an indication as to whether or not the cell is available for standalone access of that public land mobile network.

In some embodiments, wherein the cell is available for standalone access for some of the plurality of public land mobile networks; and the cell is unavailable for standalone access for some of the plurality of public land mobile networks.

In some embodiments, the method comprises, if the indication indicates that the cell is available for standalone access for a first public land mobile network supported by the device, receiving a request for standalone access for the cell from the device.

In some embodiments, the method comprises if the indication indicates that the cell is unavailable for standalone access for a first public land mobile network supported by the device, receiving a request for non-standalone access of the cell from the device.

In some embodiments, the method comprises causing the transmission to the device of a system information block comprising the indications as to whether or not the cell is available for standalone access for the plurality of public land mobile networks.

In some embodiments, for at least one of the plurality of public land mobile networks, the indication comprises a presence or absence of a tracking area code.

In some embodiments, for at least one of the plurality of public land mobile networks, the indication comprises a binary indicator in a field of tracking area code information.

In some embodiments, for at least one of the plurality of public land mobile networks, the indication comprises a binary indicator in cell access related information.

According to a third aspect, there is provided a computer program comprising instructions such that when the computer program is executed on a computing device provides a method, the computing device is arranged to perform the steps of either the first aspect or the second aspect.

According to a fourth aspect, there is provided an apparatus comprising: at least one processor and at least one memory including a computer program code, the at least one memory and the computer program code configured to, with the at least one processor, cause the apparatus at least to: detect at a device associated with a first public land mobile network, a cell; receive, for each of a plurality of public land mobile networks supported by the cell, an indication as to whether or not the cell is available for standalone access for that public land mobile network; and determine, in dependence upon the indications and based on the first public land mobile network, whether to request standalone access of the cell.

In some embodiments, the cell is available for standalone access for some of the plurality of public land mobile networks; and the cell is unavailable for standalone access for some of the plurality of public land mobile networks.

In some embodiments, the apparatus is configured to, if the indications indicate that the cell is available for standalone access for the first public land mobile network, request standalone access for the cell.

In some embodiments, at least prior to requesting standalone access for the cell, the device is in IDLE mode.

In some embodiments, the apparatus is configured to, if the indications indicate that the cell is unavailable for standalone access for the first public land mobile network, access the cell in dual connectivity mode.

In some embodiments, the apparatus is configured to receive from the base station, a system information block comprising the indications as to whether or not the cell is available for standalone access for the plurality of public land mobile networks.

In some embodiments, for at least one of the plurality of public land mobile networks, the indication comprises a presence or absence of a tracking area code.

In some embodiments, for at least one of the plurality of public land mobile networks, the indication comprises a binary indicator in a field of tracking area code information.

In some embodiments, for at least one of the plurality of public land mobile networks, the indication comprises a binary indicator in cell access related information.

According to a fifth aspect, there is provided an apparatus comprising: at least one processor and at least one memory including a computer program code, the at least one memory and the computer program code configured to, with the at least one processor, cause the apparatus at least to for each of a plurality of public land mobile networks supported by a cell, cause a transmission to a device of an indication as to whether or not the cell is available for standalone access of that public land mobile network.

In some embodiments, the cell is available for standalone access for some of the plurality of public land mobile networks; and the cell is unavailable for standalone access for some of the plurality of public land mobile networks.

In some embodiments, the apparatus is configured to, if the indication indicates that the cell is available for standalone access for a first public land mobile network supported by the device, receive a request for standalone access for the cell from the device.

In some embodiments, the apparatus configured to, if the indication indicates that the cell is unavailable for standalone access for a first public land mobile network supported by the device, receive a request for non-standalone access of the cell from the device.

In some embodiments, the apparatus is configured to cause the transmission to the device of a system information block comprising the indications as to whether or not the cell is available for standalone access for the plurality of public land mobile networks.

In some embodiments, for at least one of the plurality of public land mobile networks, the indication comprises a presence or absence of a tracking area code.

In some embodiments, for at least one of the plurality of public land mobile networks, the indication comprises a binary indicator in a field of tracking area code information.

In some embodiments, for at least one of the plurality of public land mobile networks, the indication comprises a binary indicator in cell access related information.

According to a sixth aspect, there is provided an apparatus comprising: means for detecting at a device associated with a first public land mobile network, a cell; means for receiving, for each of a plurality of public land mobile networks supported by the cell, an indication as to whether or not the cell is available for standalone access for that public land mobile network; and means for determining, in dependence upon the indications and based on the first public land mobile network, whether to request standalone access of the cell.

According to a seventh aspect, there is provided an apparatus comprising: means for, for each of a plurality of public land mobile networks supported by a cell, causing a transmission to a device of an indication as to whether or not the cell is available for standalone access of that public land mobile network.

DESCRIPTION OF FIGURES

Some examples will now be described with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
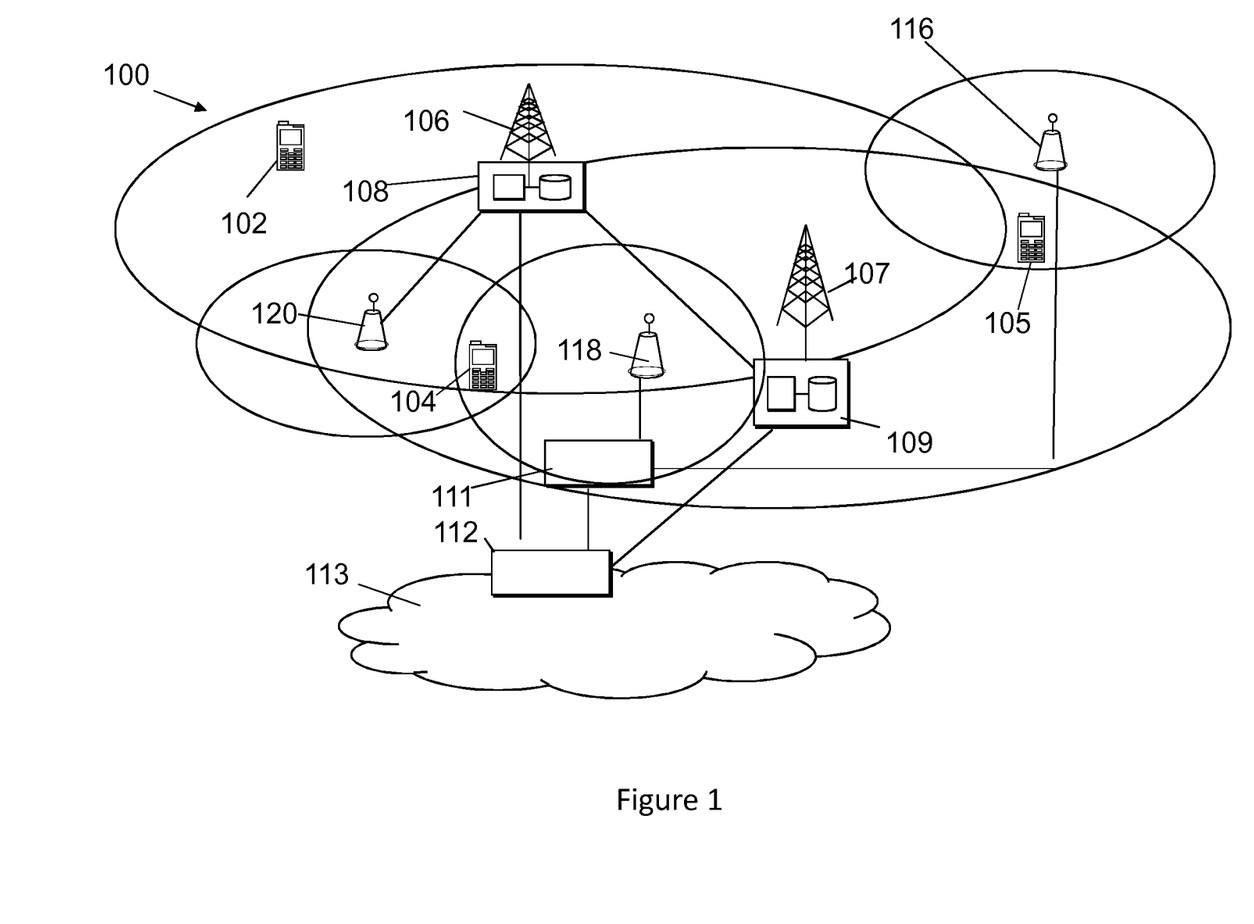
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1, base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

An example of wireless communication systems are architectures standardized by the 3rd Generation Partnership Project (3GPP). A 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In the context of radio communications, this may mean that node operations are carried out, at least partly, in a central/centralized unit, CU, (e.g. server, host or node) operationally coupled to a distributed unit, DU, (e.g. a radio head/node). It is also possible that node operations will be distributed among a plurality of servers, nodes or hosts. It should also be understood that the distribution of labour between core network operations and base station operations may differ from that of the LTE or even be non-existent. In an embodiment, the server may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary, where the responsibility is shifted between the CU and the DU, may be selected according to the specific implementation.

Figure 2:
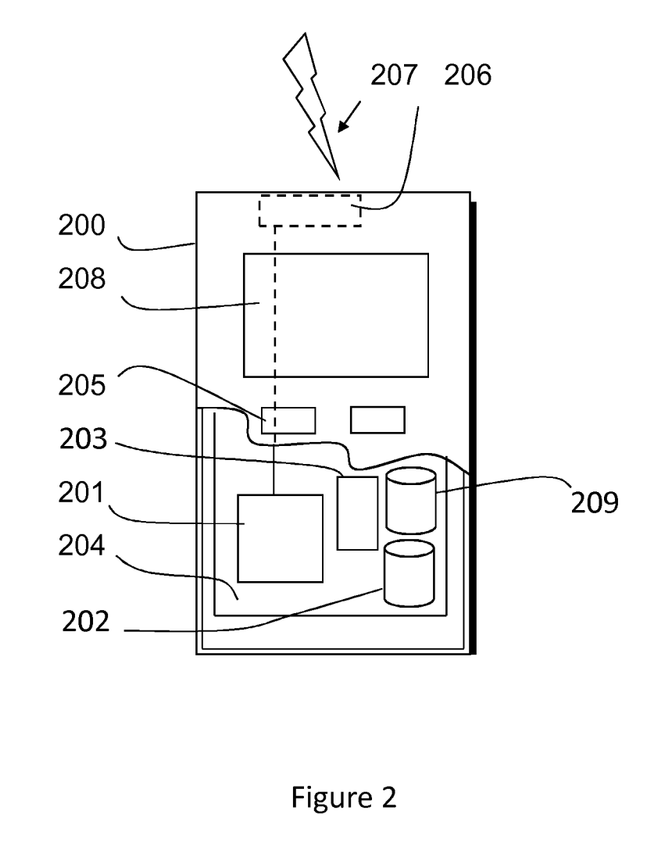
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as a user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

The mobile device 200 may receive signals over an air or radio interface 207 via appropriate apparatus for receiving and may transmit signals via appropriate apparatus for transmitting radio signals. In FIG. 2, transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
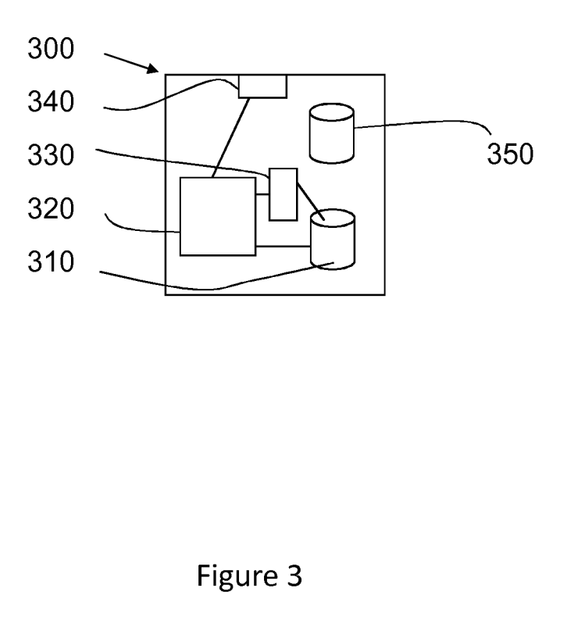
FIG. 3 shows a schematic diagram of an example control apparatus.

FIG. 3 shows an example of a control apparatus for a communication system, for example to be coupled to and/or for controlling a station of an access system, such as a RAN node, e.g. a base station, (e) node B or 5G AP, or a node of a core network such as an MME or S-GW, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one random access memory 310, at least one read only memory 350 at least one data processing unit 320, 330 and an input/output interface 340. Via the interface, the control apparatus can be coupled to a receiver and a transmitter of the base station. The receiver and/or the transmitter may be implemented as a radio front end or a remote radio head.

Different possibilities regarding the deployment of cells in a network exist. A cell may be deployed in a standalone deployment in which a cell may be accessed by devices operating in IDLE mode. In standalone mode, an IDLE device may initiate and complete an initial access procedure, in which the device accesses the cell to initiate data transfer. The initial access procedure may include cell search and selection, the receipt from the base station of the cell of system information, and the performing of a random access procedure to access the cell.

The system information that is received from the base station at the communication device may include one or more information blocks. In LTE, after the cell selection has taken place, the device is configured to receive a Master Information Block (MIB) from the eNodeB. The MIB includes an indication of the system bandwidth and information related to the Physical Hybrid-ARQ Indicator Channel (PHICH), which carries, in the downlink, Hybrid ARQ (HARQ) acknowledgements (ACK/NACK) for uplink data transfers. Following the receipt of the MIB, the device receives from the eNB, a series of system information blocks. These are numbered consecutively from 1 to 22. There are 22 SIBs (SIB1 to SIB22-NB) in the 3GPP E-UTRA standard specification. Each SIB contains specific information. SIB1 means System Information Block Type 1. SIB1 includes an indication of the cell ID, scheduling information for the remaining SIBs and cell access related information, which is required by the UE to access the cell. Since the 3GPP NR specification is not finalized, the total number of SIBs in NR is not yet known. However, according to the current 3GPP agreements, SIB1 in NR will contain information similar to the one mentioned above for E-UTRA, but with differences resulting from the specificities of NR.

A cell may be deployed in non-standalone mode (NSA), in which the cell can only be accessed in dual connectivity mode. For example, in so called option 3, a new radio (NR) cell supporting NSA can only be added to the UE as part of a SCG (Secondary Cell Group) in E-UTRA-NR Dual Connectivity (EN-DC) mode such that an LTE cell is part of the Master Cell Group (MCG). Other NSA options include, for example, option 4 (where the NR cell is part of the MCG, while the LTE cell is part of the SCG), and option 7 (where again the LTE is part of the MCG and the NR cell is part of the SCG, but they are both connected to the 5G Core Network, instead of the LTE core network (Evolved Packet Core) as in option 3). The base station of an NSA cell (which is part of a secondary cell group) in option 3 may be a secondary base station (also referred to as a Secondary Node (SN)) that provides additional radio resources to a device.

Figure 5:
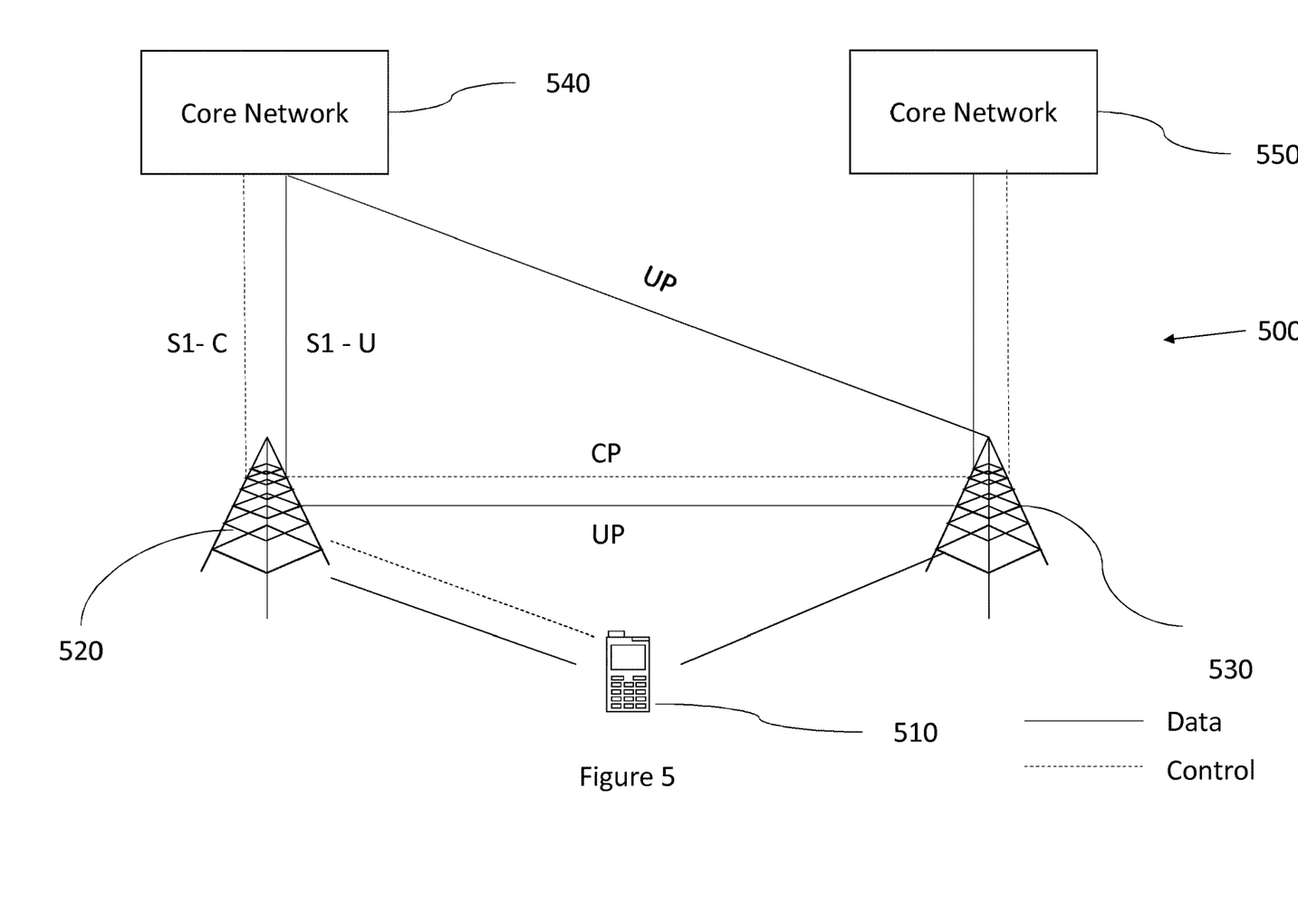
FIG. 5 shows an example communication system illustrating dual connectivity.

Reference is made to FIG. 5, which shows an example communication system 500 illustrating the standalone and non-standalone deployment scenarios for cells. In the Figure, the solid line between the components of the system indicates the data plane. On the other hand, the dashed line indicates the control plane. The communication system 500 includes a communication device 510 (e.g. a UE) that is configured to communicate with a first base station 520. The first base station 520 may be an EnodeB (in LTE) or a gNodeB (in New Radio). The first base station 520 is configured to communicate with the core network 540, by exchanging data and control information. The core network 540 may belong to a first PLMN and may serve devices associated with the first PLMN. In this example, the first device is associated with the first PLMN. Since, the first base station 520 exchanges control information directly with the core network 540 it is able to act as a master base station for the devices associated with the first PLMN. The first base station 520 therefore provides cells deployed in standalone mode for the devices associated with the first PLMN, and the device 510 is able to access these cells when in IDLE mode via an initial access procedure which it initiates with the first base station 520. Since, these cells are deployed in standalone mode, the device 510 may in some examples connect with the first base station 520 only, instead of operating in dual connectivity mode.

In the example shown in FIG. 5, the communication device 510 is configured to operate in dual connectivity mode in which it has two separate connections to different base stations. A second base station 530 is shown in the figure which is also in communication with the device 510. The second base station 530 may exchange data directly with the core network 540. However, the second base station 530 does not exchange control information directly with the core network 540. Rather, the second base station 530 exchanges control information with the first base station 520. The first base station 520 exchanges control and data information with the core network 540 and acts as a mobility anchor towards the core network 540. The data and control information exchanged between the first base station 510 and the second base station 520 may be exchanged via a backhaul communication link between the first base station 510 and the second base station 520. The second base station 530, therefore, acts as a secondary base station, which provides a secondary cell group, for the devices associated with the first PLMN. The cells of the secondary cell group may be said to be deployed in non-standalone mode. In an embodiment, the base stations 520 and 530 may be co-located as a single base station providing two (or more) cells. Out of these cells, some may support for the stand-alone access while some others may not support standalone access (i.e. support non-standalone access).

The communication device 510 may access the cells provided by the secondary base station 530 only when in dual connectivity with the first base station 520 as well as the secondary base station 530. Since the device 510 is configured to connect to a cell of the first base station 520 prior to connecting to a cell of the second base station, there is no need to perform the initial access procedure described above when connected to a cell of the second base station. The device 510 is unable to access them using the initial access procedure since the cells of the second base station 530 are not configured for operation in the standalone mode for the first PLMN.

Therefore, in the example given in FIG. 5 cells of a communication system may be deployed in a standalone mode or non-standalone mode.

One issue that may arise is that if the device 510 is unaware of which cells are configured for standalone operation and which cells are configured for non-standalone operation, the device may repeatedly make initial access requests for cells that are not configured for standalone operation. Therefore, these requests keep on being rejected by the network. This may be inefficient for the devices, which use battery power by sending the requests. It may also be inefficient for the network due to the additional signalling incurred on air interface and on network interfaces.

One proposed solution to this problem is to exclude from the information transmitted by the base station, information required by the device for sending the access requests. This may comprise excluding the SIB1 from the System Information transmissions made by the base station during the initial access procedure described above. The absence of the SIB1 may be indicated in the MIB that is received at the device from the base station. Alternatively, it could comprise transmitting the SIB1, but with the information required for the UE to perform initial access attempt omitted. In this case, the SIB1 may still include the information (e.g. so called cell access related information) that is required for the Automatic Neighbour Relation (ANR) function.

In ANR, each cell detects its neighbour and updates its neighbour cell list automatically. Since a cell does not have the measurement functionality to detect the existence of its neighbouring cells, the UE connected to a cell can be instructed by the base station to detect the cells around it and report this to the base station. The proposed modified SIB1 may omit the information required for the initial access procedure but retain the cell access related information that is required for performing the ANR function.

By omitting the SIB1 (or certain information from the SIB1), an IDLE mode device will not attempt to access the cell, since the information required for initial access will be missing. Only minimum information for ANR purposes may be provided.

In some cases, for a communication system, network sharing may be implemented. In this case, two or more operators share parts of the network infrastructure to improve economies of scale. For example, the radio access network, cell sites and backhaul transport may be shared by two or more operators. The core network equipment may remain dedicated to each operator. As a result, each operator may establish and operate its own public land mobile network (PLMN). Since, the core network may belong to a specific PLMN, whilst the base stations may be shared amongst PLMNs, the situation may arise that a particular cell of the communication system may be available for standalone access for some PLMNs, whilst only available for non-standalone access for other PLMNs. If the proposed solution described above (i.e. omitting the SIB1 or omitting the information required for the initial access procedure from transmission) is applied in this context, then the device may not transmit the access requests even if the cell is available for standalone access for the PLMN of the device, whilst not being available for standalone access for PLMNs of other devices. Hence, the proposal described above is not ideal for network sharing scenarios. Examples of the application may address these problems.

Reference is made again to FIG. 5, which in addition to the core network 540, also shows core network 550. The core network 540 belongs to a first PLMN, whilst the core network 550 belongs to a second PLMN. The core network 540 could be an Evolved Packet Core. The core network 550 could be a 5G core network. The core network 550 is connected to a second base station 530 and is configured to exchange data and control information with the second base station 530. As a result, the cells provided by the second base station are deployed in standalone mode for the second PLMN. Any communication devices that are associated with the second PLMN will be able to access the cells of the second base station in standalone mode. However, communication devices associated with the first PLMN, such as device 510, will only be able to access the cells in non-standalone mode. Therefore, as a result of network sharing, a cell may provide standalone access for some PLMNs, but not for others. Therefore, the problems associated with omitting the SIB1 in full or part, as described above, may occur.

According to examples of the application, the base station transmits to the communication device, for each of a plurality of PLMNs supported by a cell, an indication of whether or not the cell is available for standalone access for that PLMN. The device is configured to use these indications to determine whether or not to transmit an access request for standalone access of the cell. The device is configured to support a specific PLMN. If the device receives an indication that the PLMN that it supports is available for standalone access for the cell, the device transmits one or more access requests for standalone access.

If the device receives an indication that the PLMN that it supports is unavailable for standalone access, in some examples, the device may access the cell in dual connectivity mode. In the dual connectivity mode, the device may also be in communication with a further cell (a master cell). The cell for which it receives the indication may be deployed in non-standalone mode and may act as a secondary cell for the device. To access a cell in non-standalone mode, another base station (e.g. a master base station) may add the cell to the Secondary Cell Group.

The indications as to whether or not the cell is available for standalone access for the PLMNs may be included in the system information that is transmitted by the base station. The indications may be transmitted in the SIB1 that is described above. The structure of the SIB1, and examples of how the indications may be included therein, are shown in Annex A. The SIB1 contains information for evaluating if a UE is allowed to access a cell and defines the scheduling of other system information. It also contains radio resource configuration information that is common for all UEs.

The device may receive the indications and determine whether the cell supports standalone access for the PLMN that is supported by the device. If so, then the device may transmit an access request for standalone access to the cell. The access request may be an initial access request.

Figure 6:
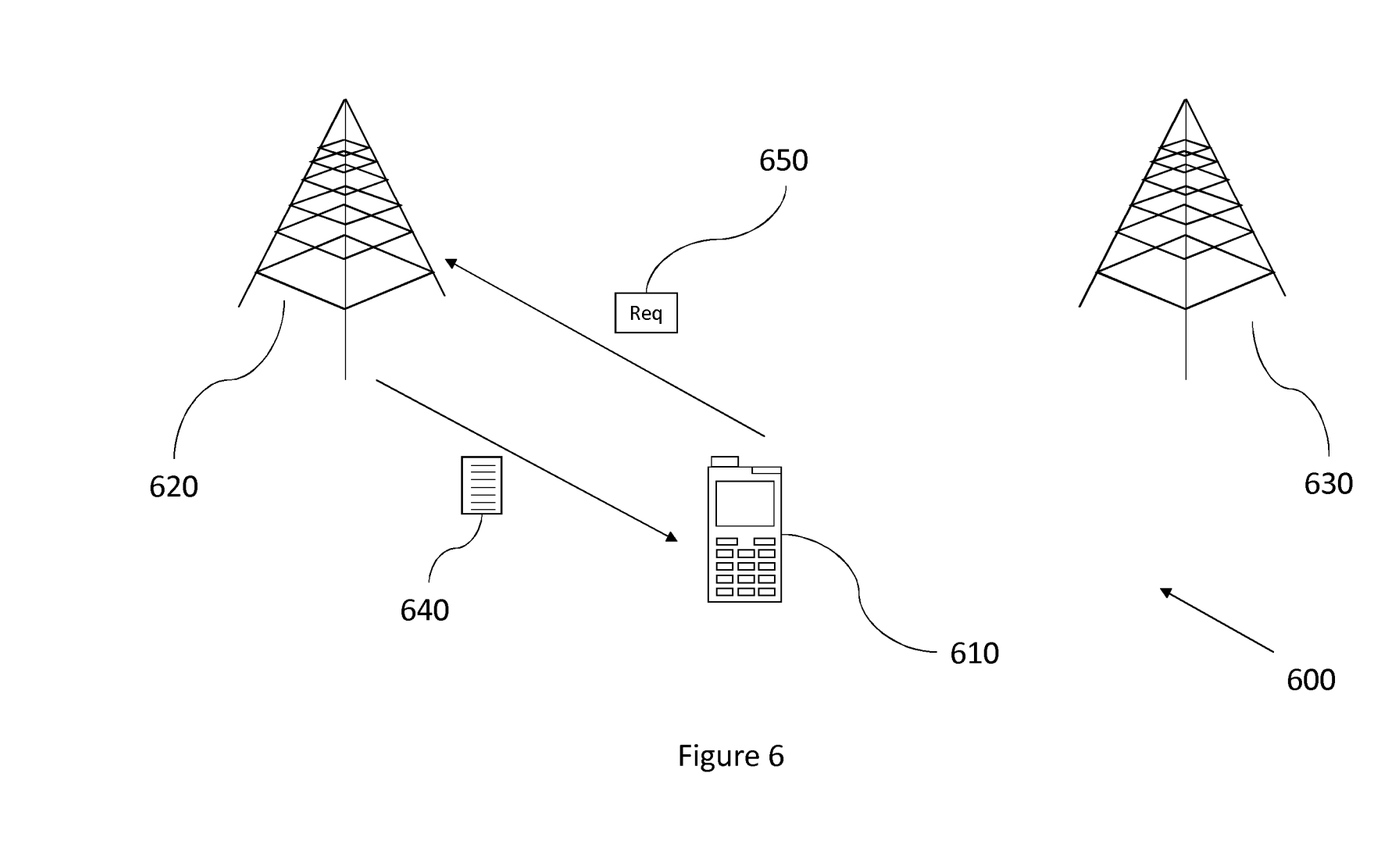
FIG. 6 shows an example communication system illustrating the initial access procedure according to examples of the application.

Reference is made to FIG. 6, which illustrates an example communication system 600 in which examples of the application may be implemented.

The examples communication system 600 includes a communication device 610 and a base station 620. The base station 620 provides one or more cells. The communication device 610 detects one of the cells. The cell is configured to support a plurality of PLMNs. The device 610 operates according to one of these PLMNs. The device 610 may be in IDLE mode prior to connecting with a cell. In an embodiment, the device 610 detects a plurality of cells wherein each cell is configured to support a plurality of PLMNs, and therefore each cell may be deployed as a standalone or non-standalone cell, based on the PLMN.

The base station 620 provides to the device 610, indications 640 as to whether or not standalone access to the cell is available for the plurality of PLMNs associated with a cell of the base station. Each indication specifically indicates whether or not the standalone access to the cell is available for a particular PLMN that is associated with the cell.

The device 610 is configured to receive the indications 640 and determine, in dependence upon the indications and the PLMN supported by the device, whether or not to transmit a request 650 for standalone access to the base station 620. If the device 610 determines that standalone access to the cell is available for the PLMN that it supports, the device transmits a request 650 for standalone access to the base station 620.

If the device determines that standalone access is unavailable for the PLMN that it supports, the device does not transmit a request 650 for standalone access to the base station 620. The device 610 may determine from the indications that the cell is available for non-standalone access for the PLMN that it supports. In this case, the device 610 may access the cell in non-standalone mode. The device 610 may access the cell in non-standalone mode if it determines from the indications that the cell is available for non-standalone mode and not available for standalone mode for the PLMN which the device supports. Accessing the cell in non-standalone mode involves accessing the cell in dual connectivity. The device 610 may, therefore, connect to both the cell of the base station 620 and another cell. The other cell may be a cell of a further base station 630. The other cell may be part of a master cell group, with the cell for which the indications are received may be part of secondary cell group.

Figure 7:
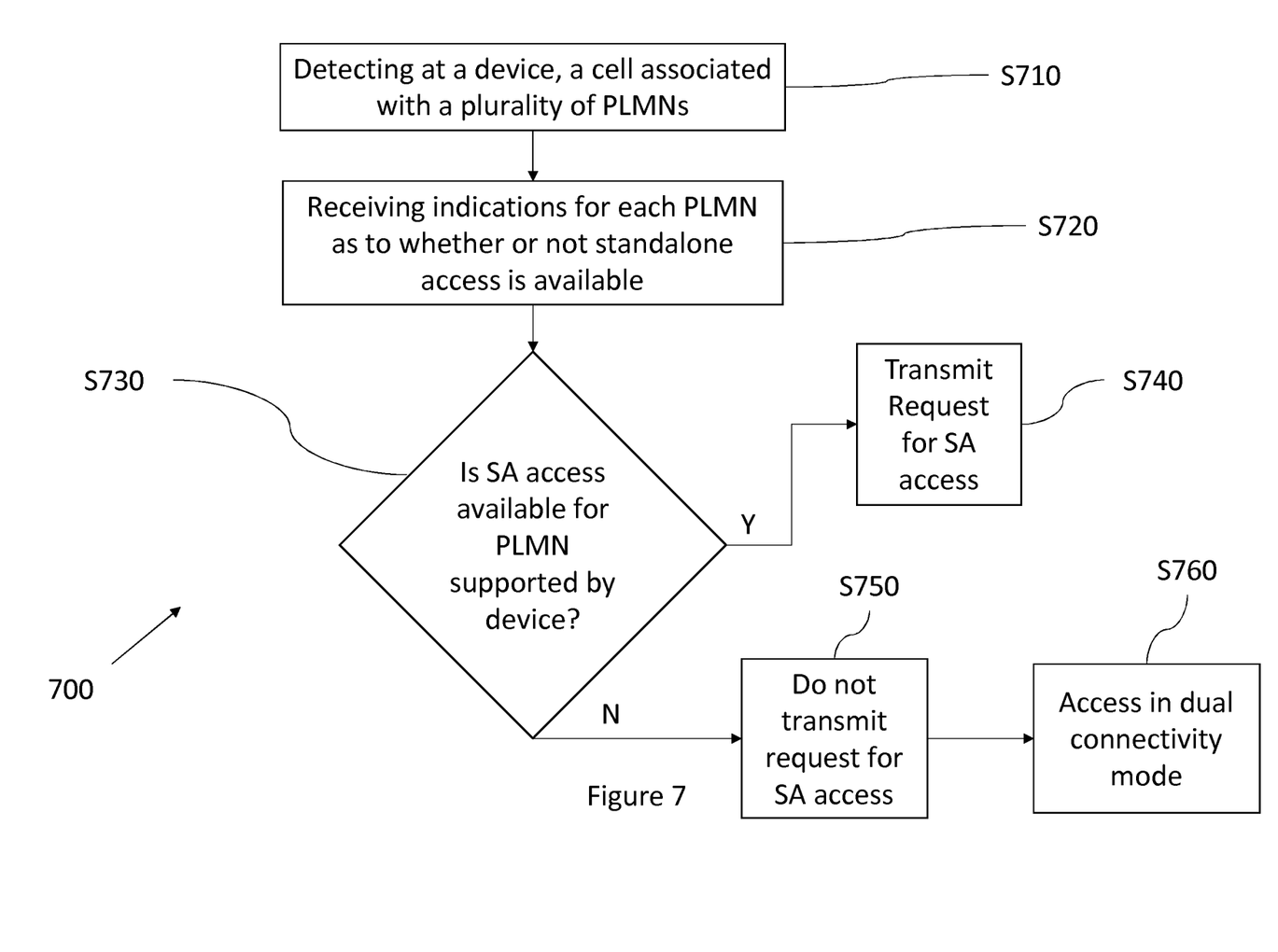
FIG. 7 shows an example of a method that may be implemented in a communication device.

Reference is made to FIG. 7, which shows an example of a method 700 that may be performed in a communication device, e.g. device 610. The device may be a UE.

At S710, the device is configured to detect a cell supporting a plurality of PLMNs.

At S720, the device is configured to receive an indication for each of the plurality of PLMNs supported by the cell as to whether or not standalone access is available for a PLMN supported by the device.

At S730, the device is configured to determine whether or not standalone (SA) access is available for the PLMN supported by the device. This determination is made based on an indication received for that PLMN at S720.

If standalone access is available for the PLMN supported by the device, the method 700 proceeds to S740, where the method 700 comprises causing the device to transmit a request for standalone access to the base station providing the cell.

If standalone access is unavailable for the PLMN supported by the device, at S750, the device does not transmit a request for standalone access for the cell. The method may proceed to S760, where the device accesses the cell in dual connectivity mode.

At S760, to access the cell in dual connectivity mode, the device may be accessing a second cell (part of a master cell group) in standalone access mode. The master base station transmits information to the device to permit the device to access the cell, for which standalone access is unavailable, in non-standalone mode. The information may comprise the secondary cell group configuration. After receiving the information, the device may access cell in non-standalone mode.

Figure 8:
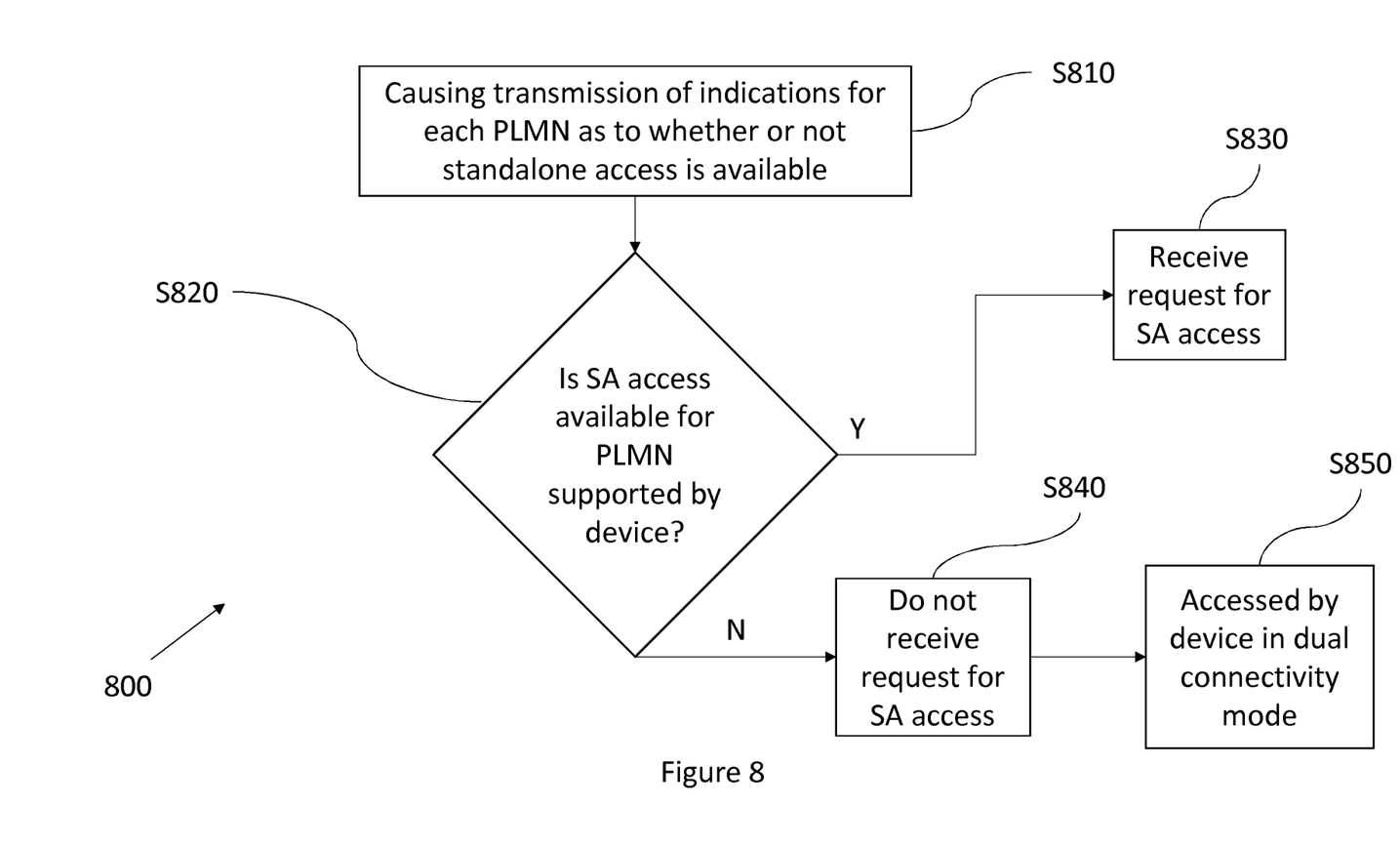
FIG. 8 shows an example of a method that may be implemented in a base station or a control apparatus for a base station.

Reference is made to FIG. 8, which illustrates an example of a method 800 that may be performed in a base station or in a control apparatus of the base station. The base station provides at least one cell.

At S810, the method comprises causing the transmission of indications for each PLMN supported by the cell as to whether or not standalone access is available for that PLMN.

At S820, if standalone access is available for the PLMN supported by the device, the method proceeds to S830. On the other hand, if standalone access is not available for the PLMN supported by the device, the method proceeds to S840.

At S830, the base station receives from the device, a request for standalone access for the cell.

At S840, the base station does not receive a request for standalone access for the cell.

The method may proceed to S850, in which the cell is accessed by the device in dual connectivity mode. This may comprise the base station receiving and responding to a request for non-standalone access to the cell.

Without providing the indication of the present application, standalone capable devices belonging to a PLMN that does not support for standalone operation for a particular cell may keep on attempting to access that cell and will, therefore, keep on being rejected by the network. This will unnecessarily waste battery power by sending those requests over the network and waste radio resources due to the additional unnecessary signalling incurred on the air interface and on the network interfaces. By providing the indications to the device, examples of the application may address these issues.

It should be understood that each block of the flowcharts of FIGS. 7 and 8, and any combination thereof may be implemented by various means or their combinations, such as hardware, software, firmware, one or more processors and/or circuitry.

The methods may be implemented on a mobile device as described with respect to FIG. 2 or control apparatus as shown in FIG. 3.

In one embodiment, the cell for which the indications are sent does not belong to a closed subscriber group (CSG). In one embodiment, the indications from the cell are not related to CSG.

Control functions may comprise detecting at a device associated with a first public land mobile network, a cell; receiving, for each of a plurality of public land mobile networks supported by the cell, an indication as to whether or not the cell is available for standalone access for that public land mobile network; and determining, in dependence upon the indications and based on the first public land mobile network, whether to request standalone access of the cell.

Additionally or alternatively, control functions may comprise: for each of a plurality of public land mobile networks supported by a cell, causing a transmission to a device of an indication as to whether or not the cell is available for standalone access of that public land mobile network.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE/LTE-A/New Radio, similar principles can be applied in relation to other networks and communication systems. For example, the principles may be applied to devices operating using multi-connectivity. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Figure 4:
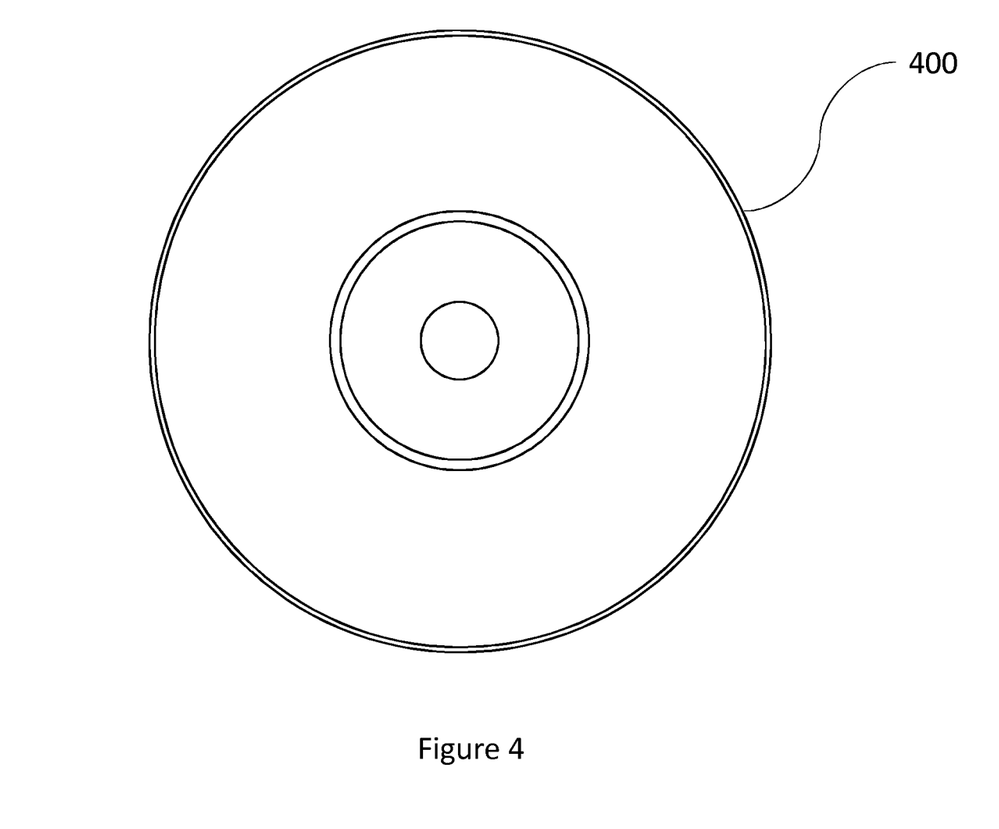
FIG. 4 illustrates an example of a non-transitory computer readable medium.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media. An example of a non-transitory computer readable medium 400 is shown in FIG. 4. The non-transitory computer readable medium 400 may be a CD or DVD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims.

However, all such and similar modifications of the teachings of this invention will still fall within the scope of this invention as defined in the appended claims. Indeed there is a further embodiment comprising a combination of one or more embodiments with any of the other embodiments previously discussed.

Annex A

The following provides an indication of the structure of the SIB1 message and its constituent elements that may be used to indicate to a device whether or not standalone access is supported by the cell for specific PLMNs. Sections 1 to 5 illustrate the structure of a typical SIB1 message. Sections 6 to 9 illustrate part of the structure of a modified SIB1 message that indicates whether or not the standalone access is available for each PLMN.

For the SIB1 message, the following may apply:
RLC-SAP (Radio Link Control-Service Access Points): Transparent Mode
Logical Channels: Broadcast Control Channel (BCCH)
1. SIB1 Message
The structure of an SIB1 message is as follows:

```
-- ASN1START
-- TAG-SIB1-START
SIB1 ::=        SEQUENCE {
        multiFrequencyBandListNR        MultiFrequencyBandListNR
        OPTIONAL,
```

```
    p-Max                   P-Max                                      OPTIONAL,
    cellSelectionInfo       SEQUENCE {
        q-RxLevMin              Q-RxLevMin,
        q-QualMin               Q-Qualmin           OPTIONAL    -- Need N
    }                                                          OPTIONAL,
    cellAccessRelatedInfo   SEQUENCE (SIZE (1..maxPLMN)) OF
                                CellAccessRelatedInfo,
    cellReservedConfig      CellReservedConfig                 OPTIONAL,
    ranAC                   RANNotificationAreaCode            OPTIONAL,
    ac-BarringInfo          AC-BarringInfo                     OPTIONAL,
    otherSI-Info            OtherSI-Info
    OPTIONAL,
    servingCellConfigCommon     ServingCellConfigCommon        OPTIONAL,
    ims-EmergencySupport        ENUMERATED {true}
    OPTIONAL,
    eCallOverIMS-Support        ENUMERATED {true}
    OPTIONAL,
    lateNonCriticalExtension    OCTET STRING
    OPTIONAL,
    nonCriticalExtension        SEQUENCE{ }
    OPTIONAL
}
-- TAG-SIB1-STOP
-- ASN1STOP
```

2. CellAccessRelatedInfo element

The IE CellAccessRelatedInfo is, as shown above, part of the SIB1 message, and indicates cell access related information for this cell. The structure is as follows:

```
-- ASN1START
-- TAG-CELL-ACCESS-RELATED-INFO-START
CellAccessRelatedInfo           SEQUENCE {
    plmn-IdentityList               PLMN-IdentityList,
    trackingAreaCode                TrackingAreaCode
    cellIdentity                    CellIdentity
}
--TAG- CELL-ACCESS-RELATED-INFO-STOP
-- ASN1STOP
```

3. PLMN-IdentityList

The PLMN-IdentityList is, as shown above, part of the CellAccessRelatedInfo, and provides a list of PLMN identities. The structure is shown below:

```
-- ASN1START
-- TAG-PLMN-IDENTITY-LIST-START
PLMN-IdentityList ::=       SEQUENCE (SIZE (1..maxPLMN)) OF PLMN-IdentityInfo
PLMN-IdentityInfo ::=       SEQUENCE {
    plmn-Identity               PLMN-Identity,
    ...
}
-- TAG-PLMN-IDENTITY-LIST-STOP
-- ASN1STOP
```

4. PLMN Identity Element

The PLMN-IdentityList comprises IE PLMN-Identity elements. Each PLMN-Identity element identifies a Public Land Mobile Network.

```
-- ASN1START
-- TAG-PLMN-IDENTITY-START
PLMN-Identity ::=       SEQUENCE {
    mcc                     MCC             OPTIONAL,
    mnc                     MNC
}
```

```
MCC ::=                 SEQUENCE (SIZE (3)) OF
                            MCC-MNC-Digit
MNC ::=                 SEQUENCE (SIZE (2..3)) OF
                            MCC-MNC-Digit
MCC-MNC-Digit ::=       INTEGER (0..9)
-- TAG-PLMN-IDENTITY-STOP
-- ASN1STOP
```

5. CellIdentity Information Element

The IE CellIdentity is, as shown above, part of the CellAccessRelatedInfo, and is used to unambiguously identify a cell within a PLMN.

```
-- ASN1START
CellIdentity ::=        BIT STRING (SIZE (36))
```

```
-- ASN1STOP
TrackingAreaCode ::=    ENUMERATED {ffsTypeAndValue}
```

6. CellAccessRelatedInfo in Modified MIB1

As in the case of the typical SIB1, the IE CellAccessRelatedInfo indicates cell access related information for this cell. In this case, it provides a Tracking Area Code of the cell for PLMNs indicated in plmn-identityList. If absent for the PLMN to which the UE is registered, the UE should not attempt to access this cell. The structure of the CellAccessRelatedInfo may be given by:

```
-- ASN1START
-- TAG-CELL-ACCESS-RELATED-INFO-START
CellAccessRelatedInfo           SEQUENCE {
    plmn-IdentityList           PLMN-IdentityList,
    trackingAreaCode              TrackingAreaCode    OPTIONAL, -- Need S
    cellIdentity                  CellIdentity
}
--TAG- CELL-ACCESS-RELATED-INFO-STOP
-- ASN1STOP
```

7. TrackingAreaCode in Modified MIB1

The tracking area code in CellAccessRelatedInfo may be specified in the following way:

```
TrackingAreaCode                CHOICE {
    trackingAreaCode            BIT STRING (SIZE (24)),
    initialAccessNotAllowed     NULL
}
```

8. Alternative TrackingAreaCode in Modified SIB1

In some examples of the application, the tracking area code may be provided in the SIB1 for cells configured for non-standalone access cells. This may be included, for example, for a Handover Restriction List. The tracking area code in CellAccessRelatedInfo may be specified in the following way:

```
TrackingAreaCode                SEQUENCE {
    trackingAreaCode            BIT STRING (SIZE (24)),
    initialAccessAllowed        BOOLEAN
}
```

9. Alternative CellAccessRelatedInfo in Modified MIB1

In some examples, an initial access allowed flag can be provided directly in the access related info. This is a Boolean value that indicates for each PLMN whether standalone access is allowed or not. The structure is given by:

```
-- ASN1START
-- TAG-CELL-ACCESS-RELATED-INFO-START
CellAccessRelatedInfo           SEQUENCE {
    plmn-IdentityList           PLMN-IdentityList,
    trackingAreaCode              TrackingAreaCode,
    cellIdentity                  CellIdentity,
    initialAccessAllowed          BOOLEAN
}
--TAG- CELL-ACCESS-RELATED-INFO-STOP
-- ASN1STOP
```

The invention claimed is:

1. A method comprising:
   detecting a cell at a user equipment associated with a first public land mobile network of a plurality of public land mobile networks supported by the cell;
   receiving, at the user equipment for each of the plurality of public land mobile networks supported by the cell, an indication as to whether the cell is available for standalone access for a corresponding one of the public land mobile networks, wherein the indication comprises a presence or absence of a tracking area code for the corresponding public land mobile network; and
   determining, at the user equipment and based on the indication for the first public land mobile network, whether to request standalone access to the cell.

2. A method as claimed in claim 1, wherein the cell is available for standalone access for some of the plurality of public land mobile networks; and the cell is unavailable for standalone access for some of the plurality of public land mobile networks.

3. A method as claimed in claim 1, further comprising, if the indications indicate that the cell is available for standalone access for the first public land mobile network, requesting standalone access for the cell.

4. A method as claimed in claim 3, wherein at least prior to requesting standalone access for the cell, the user equipment is in IDLE mode.

5. A method comprising:
   for each of a plurality of public land mobile networks supported by a cell, causing a transmission, from a base station to a device, of an indication as to whether the cell is available for standalone access for a corresponding one of the public land mobile networks, wherein the indication comprises a presence or absence of a tracking area code for the corresponding public land mobile network.

6. A method as claimed in claim 5, further comprising, if the indication indicates that the cell is available for standalone access for a first public land mobile network supported by the device, receiving a request for standalone access to the cell from the device.

7. A non-transitory computer readable medium storing instructions such that when the instructions are executed on a computing device, the computing device is arranged to perform:
   detecting a cell at a user equipment associated with a first public land mobile network of a plurality of public land mobile networks supported by the cell;
   receiving, at the user equipment for each of the plurality of public land mobile networks supported by the cell, an indication as to whether the cell is available for standalone access for a corresponding one of the public land mobile networks, wherein the indication comprises a presence or absence of a tracking area code for the corresponding public land mobile network; and
   determining, at the user equipment and based on the indication for the first public land mobile network, whether to request standalone access to the cell.

8. An apparatus comprising:
   at least one processor and at least one memory including a computer program code, the at least one memory and the computer program code configured to, with the at least one processor, cause the apparatus at least to:
   detect a cell at a user equipment associated with a first public land mobile network of a plurality of public land mobile networks supported by the cell;
   receive, at the user equipment for each of the plurality of public land mobile networks supported by the cell, an indication as to whether the cell is available for standalone access for a corresponding one of the public land mobile networks, wherein the indication comprises a presence or absence of a tracking area code for the corresponding public land mobile network; and determine, at the user equipment and based on the indication for the first public land mobile network, whether to request standalone access to the cell.

9. An apparatus as claimed in claim 8, wherein the cell is available for standalone access for some of the plurality of public land mobile networks; and the cell is unavailable for standalone access for some of the plurality of public land mobile networks.

10. An apparatus as claimed in claim 8, configured to, if the indications indicate that the cell is available for standalone access for the first public land mobile network, request standalone access to the cell.

11. An apparatus as claimed in claim 10, wherein at least prior to requesting standalone access for the cell, the user equipment is in IDLE mode.

12. An apparatus as claimed in claim 8, configured to, if the indications indicate that the cell is unavailable for standalone access for the first public land mobile network, access the cell when configured to operate in dual connectivity mode.

13. An apparatus as claimed in claim 8, configured to receive from a base station, a system information block comprising the indications as to whether the cell is available for standalone access for the plurality of public land mobile networks.

14. An apparatus as claimed in claim 8, wherein, for at least one of the plurality of public land mobile networks, the indication comprises a binary indicator in a field of tracking area code information.

15. An apparatus as claimed in claim 8, wherein, for at least one of the plurality of public land mobile networks, the indication comprises a binary indicator in cell access related information.

16. An apparatus comprising:
at least one processor and at least one memory including a computer program code, the at least one memory and the computer program code configured to, with the at least one processor, cause the apparatus at least to:
for each of a plurality of public land mobile networks supported by a cell, cause a transmission, from a base station to a device, of an indication as to whether the cell is available for standalone access for a corresponding one of the public land mobile networks, wherein the indication comprises a presence or absence of a tracking area code for the corresponding public land mobile network.

17. An apparatus as claimed in claim 16, configured to, if the indication indicates that the cell is available for standalone access for a first public land mobile network supported by the device, receive a request for standalone access to the cell from the device.

18. An apparatus as claimed in claim 16, configured to, if the indication indicates that the cell is unavailable for standalone access for a first public land mobile network supported by the device, receive a request for non-standalone access to the cell from the device.

19. An apparatus as claimed in claim 16, configured to cause the transmission to the device of a system information block comprising the indications as to whether the cell is available for standalone access for the plurality of public land mobile networks.

20. A non-transitory computer readable medium storing instructions such that when the instructions are executed on a computing device, the computing device is arranged to perform:
for each of a plurality of public land mobile networks supported by a cell, causing a transmission, from a base station to a device, of an indication as to whether the cell is available for standalone access for a corresponding one of the public land mobile networks, wherein the indication comprises a presence or absence of a tracking area code for the corresponding public land mobile network.

* * * * *